United States Patent
Osamura

(10) Patent No.: US 12,527,341 B2
(45) Date of Patent: Jan. 20, 2026

(54) METHOD FOR PREVENTING OIL SEPARATION IN PROCESSED FOOD

(71) Applicant: KABUSHIKI KAISHA ALONE WORLD, Yokohama (JP)

(72) Inventor: Kazunori Osamura, Ayase (JP)

(73) Assignee: KABUSHIKI KAISHA ALONE WORLD, Kanagawa (JP)

( * ) Notice: Subject to any disclaimer, the term of this patent is extended or adjusted under 35 U.S.C. 154(b) by 599 days.

(21) Appl. No.: 16/635,963

(22) PCT Filed: Mar. 25, 2019

(86) PCT No.: PCT/JP2019/012368
§ 371 (c)(1),
(2) Date: Jan. 31, 2020

(87) PCT Pub. No.: WO2019/193999
PCT Pub. Date: Oct. 10, 2019

(65) Prior Publication Data
US 2020/0245665 A1    Aug. 6, 2020

(30) Foreign Application Priority Data

Apr. 4, 2018  (JP) ................. 2018-072704

(51) Int. Cl.
*A23L 29/10* (2016.01)

(52) U.S. Cl.
CPC ..................... *A23L 29/10* (2016.08)

(58) Field of Classification Search
None
See application file for complete search history.

(56) References Cited

U.S. PATENT DOCUMENTS

| | | | |
|---|---|---|---|
| 5,624,544 A | 4/1997 | Deguchi et al. | |
| 6,613,375 B2 | 9/2003 | Moreau et al. | |
| 2001/0026833 A1 | 10/2001 | Moreau et al. | |
| 2014/0017385 A1 | 1/2014 | Toyoizumi et al. | |

FOREIGN PATENT DOCUMENTS

| | | |
|---|---|---|
| EP | 1329164 A1 | 7/2003 |
| JP | H08024865 A | 1/1996 |
| JP | H10313820 A | 12/1998 |
| JP | 2000210047 A | 8/2000 |
| JP | 2001186855 A | 7/2001 |
| JP | 2003018973 A | 1/2003 |
| JP | 2006067995 A | 3/2006 |
| JP | 2013013369 A | 1/2013 |
| JP | 2016086772 A | 5/2016 |
| JP | 2018027065 A | 2/2018 |
| JP | 2018038293 A | 3/2018 |
| WO | 2012133672 A1 | 10/2012 |

OTHER PUBLICATIONS

Nagamura: JP2004337011A Emulsified oil-and-fat composition; published Dec. 2, 2004. (Year: 2004).*
RM: Martinez: Finally Make Silky, Low-Fuss Vinaigrette That Won't Separate; Bon Appétit; published online, at least by Feb. 12, 2016 at: https://web.archive.org/web/20160212031537/https://www.bonappetit.com/test-kitchen/how-to/article/how-to-emulsify-vinaigrette (Year: 2016).*
Yamada Masaharu: Method for manufacturing herb sauce; Publication No. JP 2014-147345 A, published Aug. 21, 2014. (Year: 2014).*
HC: Hungry Couple: Herbed Roasted Potatoes with Sour Cream Dip; published online at least by Dec. 2, 2015 as shown in the Comment section. (Year: 2015).*
Urbus: Exquisite, Edible, Emulsions!; published Jun. 1, 2011 (Year: 2011).*
NPR: Catch-All Herb Salad With Lemon-Sage Vinaigrette; published at least by Jun. 12, 2011 at: https://web.archive.org/web/20110612061153/https://www.npr.org/2011/06/07/137035685/catch-all-herb-salad-with-lemon-sage-vinaigrette (Year: 2011).*
Fuse: Publication No. JP 2016-86772 A Published on May 23, 2016. (Year: 2016).*
Extended European Search Report (EESR) dated Dec. 20, 2021, issued in counterpart European Application No. 19768693.4.

(Continued)

*Primary Examiner* — Patricia A George
(74) *Attorney, Agent, or Firm* — Holtz, Holtz & Volek PC

(57) ABSTRACT

Provided is a method for preventing oil separation in a processed food, the method being capable of emulsifying an oil in the processed food produced by mixing a food raw material containing water and large quantities of an edible oil, and appropriately avoiding oil separation. Emulsified oil-water is mixed into the processed food produced by mixing the edible oil with the food raw material containing water, and the mixture is stirred. Furthermore, as the emulsified oil-water to be mixed into the processed food, a mixture obtainable by mixing electrolyzed alkaline ionized water with a pH of 12 or more and an edible oil, and stirring to emulsify the mixture is used. The mixing ratio of the edible oil to the electrolyzed alkaline ionized water in the emulsified oil-water is 10:90 by weight ratio. The proportion, to an oil content in the processed food, of the emulsified oil-water to be mixed into the processed food ranges from 10 to 40 wt %.

9 Claims, 3 Drawing Sheets

(56) References Cited

OTHER PUBLICATIONS

International Search Report (ISR) dated Jun. 18, 2019 (and English translation thereof), issued in International Application No. PCT/JP2019/012368.
Written Opinion of the International Searching Authority dated Jun. 18, 2019 issued in International Application No. PCT/JP2019/012368.
European Office Action dated May 23, 2025, issued in counterpart European Application No. 19768693.4.
Australian Examination Report dated Dec. 19, 2023, issued in counterpart Australian Application No. 2019236720.
"Food Recipes", [retrieved from internet on Dec. 13, 2023] https://web.archive.org/web/20170320114930/http://www.kangenwatertasmania.com.au/wp-content/uploads/2015/12/Food-Recipes.pdf> published on Mar. 20, 2017.
"Specific Uses and Therapies of the Various Kangen Waters", [retrieved from internet on Dec. 13, 2023] <URL: http://www.kangenwatertasmania.com.au/wp-content/uploads/2016/02/Uses-of-the-various-Kangen-waters.pdf> published on Mar. 20, 2017.

* cited by examiner

METHOD FOR PREVENTING OIL SEPARATION IN PROCESSED FOOD

TECHNICAL FIELD

The present invention relates to a method for preventing oil separation in various seasonings and other processed foods (such as a basil paste, ramen soup, flavor oil, and salad dressing) produced by mixing "food raw materials containing water" and "an edible oil".

BACKGROUND ART

A basil paste widely used as a sauce of pasta, pizza, or the like is produced by charging fresh basil (or frozen basil) serving as a raw material, an edible oil (such as olive oil) in an approximately equivalent amount to the basil, and a salt into a mixer, and crushing, mixing, and stirring the mixture. It is known that when the processed food produced by mixing "a food raw material containing water" and "a large amount of edible oil" as with the basil paste is distributed or stored at an ordinary temperature or in a frozen state, the oil separates over time, or upon unfreezing.
Patent Document 1: JP 2018-27065 A

SUMMARY OF INVENTION

Technical Problem

When a basil paste in which the oil has separated is used for a cooked food such as pasta or pizza, the cooked food feels very oily and heavy when eaten. Further, the oil is undesirably deposited thickly on the dish with the cooked food put thereon. Further, the fragrance or coloring inherent in food is also undesirably degraded.

The present invention attempts to solve such a problem in the conventional art. It is an object of the present invention to provide a method for preventing oil separation in a processed food, the method being capable of emulsifying an oil in the processed food produced by mixing "a food raw material containing water" and "a large amount of an edible oil", and advantageously avoiding oil separation.

Solution to Problem

A method for preventing oil separation in a processed food in accordance with the present invention is characterized by including mixing emulsified oil-water into the processed food produced by mixing an edible oil with a food raw material containing water, and stirring the mixture. The method is also characterized in that as the emulsified oil-water to be mixed into the processed food, a mixture obtainable by mixing electrolyzed alkaline ionized water and an edible oil, and stirring to emulsify the mixture is used; that the mixing ratio of the edible oil to the electrolyzed alkaline ionized water in the emulsified oil-water ranges from 9:91 to 11:89 by weight ratio; and that the proportion, to an oil content in the processed food, of the emulsified oil-water to be mixed into the processed food ranges from 10 to 40 wt %.

Furthermore, as the emulsified oil-water to be mixed into the processed food, a mixture obtainable by mixing electrolyzed alkaline ionized water with a pH of 12 or more and an edible oil, and stirring to emulsify the mixture is preferably used.

Advantageous Effects of Invention

When the method for preventing oil separation in a processed food in accordance with the present invention is applied to a processed food produced by mixing "a food raw material containing water" and "an edible oil", the oil in the target processed food can be appropriately emulsified, and it is possible to appropriately avoid oil separation in the target processed food.

Particularly, even when the processed food subjected to the method in accordance with the present invention is once frozen, followed by unfreezing, the oil can remain unseparated, further, the fragrance and the color inherent in the food used as the raw material for the processed food can persist, and still further, the processed food including a large amount of oil can be made to be less likely to feel oily or heavy due to oil.

DESCRIPTION OF EMBODIMENTS

Figure 1:
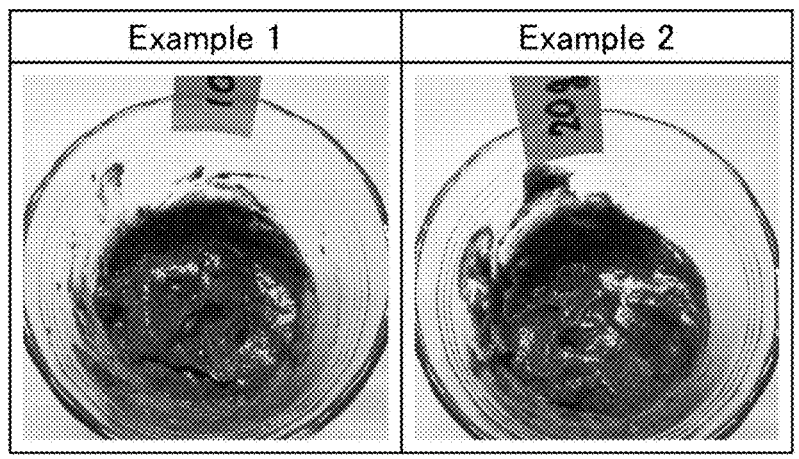
FIG. 1 represents photographs of emulsified basil pastes or the like produced as examples of a method for preventing oil separation in a processed food in accordance with the present invention, the emulsified basil pastes or the like having been once fully frozen, followed by unfreezing and gently agitating, and then allowed to stand still for 15 minutes.
Figure 1:
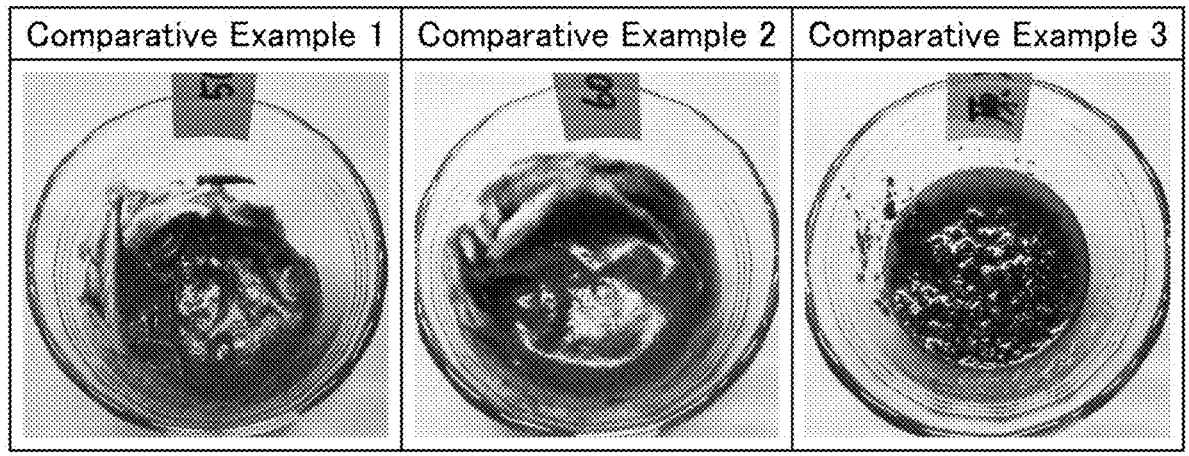

A method for preventing oil separation in a processed food in accordance with the present invention is characterized by including mixing emulsified oil-water at a specific proportion into a target processed food (a processed food produced by mixing an edible oil with a food raw material containing water) and stirring the mixture. By subjecting the target processed food to the method in accordance with the present invention, the oil in the target processed food can be appropriately emulsified (i.e., an emulsified processed food can be produced), and it is possible to appropriately avoid oil separation in the target processed food.

Particularly, even when the processed food subjected to the method in accordance with the present invention is once frozen, followed by unfreezing, the oil can remain unseparated, further, the fragrance and the color inherent in the food used as the raw material for the target processed food can persist, and still further, the processed food including a large amount of oil can be made to be less likely to feel oily or heavy due to oil.

In the present embodiment, as the emulsified oil-water to be mixed into the target processed food, a mixture obtainable by mixing an edible oil (vegetable oil such as salad oil or olive oil) at a specific proportion into electrolyzed alkaline ionized water with a pH of 12 or more, and stirring to emulsify the mixture. The mixing ratio of the edible oil to the electrolyzed alkaline ionized water in the emulsified oil-water preferably ranges from 9:91 to 11:89 by weight ratio (the edible oil ranging from 9 to 11 wt % and the electrolyzed alkaline ionized water ranging from 89 to 91 wt %), and is most preferably 10:90 (10 wt % edible oil and 90 wt % electrolyzed alkaline ionized water).

When as the emulsified oil-water to be mixed into the target processed food, the one containing a too small proportion of the edible oil is used, the oil in the target processed food cannot be emulsified easily by stirring. This undesirably results in prolonged time required for stirring for emulsifying the oil in the target processed food (30 minutes or more). On the other hand, when the proportion of the edible oil to be mixed with electrolyzed alkaline ionized water for generating emulsified oil-water is too large, the length of time required for stirring for emulsifying the edible oil mixed with the electrolyzed alkaline ionized water becomes very long (only within a realistic stirring time, it is very difficult to produce the emulsified oil-water in which the mixed edible oil is fully emulsified in an appropriate state), undesirably resulting in an increase in processing cost of the target processed food (the production cost of the emulsified processed food).

In contrast, when the edible oil is mixed at a proportion in the range of 9 to 11 wt % with the electrolyzed alkaline ionized water, it is possible to form emulsified oil-water in which the mixed edible oil is appropriately emulsified. Further, when the emulsified oil-water is mixed into the target processed food, only stirring for about 10 to 20 minutes can appropriately emulsify the oil in the target processed food. Accordingly, it is possible to produce an emulsified processed food efficiently and at a low cost.

The proportion, to the oil content in the target processed food, of the emulsified oil-water to be mixed into the target processed food preferably ranges from 10 to 40 wt % (more preferably 23 to 40 wt %).

When the proportion, to the oil content in the target processed food, of the emulsified oil-water to be mixed into the target processed food is less than 10 wt %, the affinity between the target processed food and the emulsified oil-water is poor. Accordingly, even after stirring, the oil largely separates, and the target processed food becomes very oily, which undesirably adversely affects the taste. Further, the high viscosity is also caused, and this causes difficulty in stirring, undesirably resulting in poor workability during production. Further, stirring takes more time, causing low production efficiency. In addition, a favorable emulsified state of the oil in the target processed food cannot be achieved, and it is difficult to obtain the target processed food in which the food raw materials and the oil are uniformly mixed, undesirably resulting in a less stable product.

On the other hand, when the proportion, to the oil content in the target processed food, of the emulsified oil-water to be mixed into the target processed food is larger than 40 wt %, the overall production cost undesirably increases because the emulsified oil-water itself is not inexpensive. Further, undesirably, the fragrance (flavor) or the color inherent in the food (the food raw materials to be mixed with an edible oil) used as the raw materials for the target processed food is degraded. In contrast, when the proportion, to the oil content in the processed food, of the emulsified oil-water to be mixed into the target processed food is within the range of 10 to 40 wt %, the oil in the target processed food can be appropriately emulsified without causing the problems as described above, providing appropriate prevention of oil separation.

Now, in order to verify the effects of the method for preventing oil separation in a processed food in accordance with the present invention, the results of the experiments performed by the present inventors will be described as examples of the present invention.

EXAMPLES

First, as the target processed food to which the method in accordance with the present invention is applied, a basil paste (obtained by charging 100 parts by weight of a fresh basil, 100 parts by weight of an edible oil (a vegetable oil), and 7 parts by weight of a salt into a mixer, and crushing, mixing and stirring the materials) was prepared. In addition, emulsified oil-water was prepared. Note that the mixing ratio of the edible oil and electrolyzed alkaline ionized water (pH 12) in the emulsified oil-water was 10:90 by weight ratio (10 wt % edible oil and 90 wt % electrolyzed alkaline ionized water).

Then, into the basil paste, the emulsified oil-water was mixed in different proportions (proportions relative to the oil content in the basil paste, namely, proportions relative to the edible oil (vegetable oil) mixed as the raw material for the basil paste). The resulting mixtures were stirred, thereby emulsifying the oil in the basil paste (emulsified basil pastes were produced). The proportions of the emulsified oil-water mixed into the basil paste were as follows. Whereas, the basil paste, in which the emulsified oil-water was not mixed, was referred to as Comparative Example 3.

Example 1: 10 wt % relative to the oil content in the basil paste

Example 2: 20 wt % relative to the oil content in the basil paste

Example 3: 40 wt % relative to the oil content in the basil paste

Comparative Example 1: 50 wt % relative to the oil content in the basil paste

Comparative Example 2: 60 wt % relative to the oil content in the basil paste

Comparative Example 3: 0%

FIG. 1 represents photographs of the emulsified basil pastes of Examples 1, 2, and Comparative Examples 1, 2, and the basil paste of Comparative Example 3, which have been once fully frozen, followed by unfreezing, and gently agitating, and then allowed to stand still for 15 minutes. As shown in these photographs, it was indicated that, in each emulsified basil paste of Examples 1, 2, and Comparative Examples 1, 2, the oil in the basil paste was favorably emulsified, resulting in a totally uniform paste form, and oil separation was prevented. On the other hand, in the basil paste of Comparative Example 3, it was indicated that the oil largely separated.

These results indicated the following: when a basil paste is once frozen and then unfreezed, oil separation proceeds, resulting in an increase in heaviness and oiliness; however, when the emulsified oil-water prepared at a proper mixing ratio is mixed into the basil paste at a proper proportion, and stirred, the oil in the basil paste can be appropriately emulsified; as a result, even when the paste is once frozen and then unfreezed, oil separation can be prevented, and its form (the totally uniform paste form), color, and the like can be kept the same as before freezing.

Figure 2:
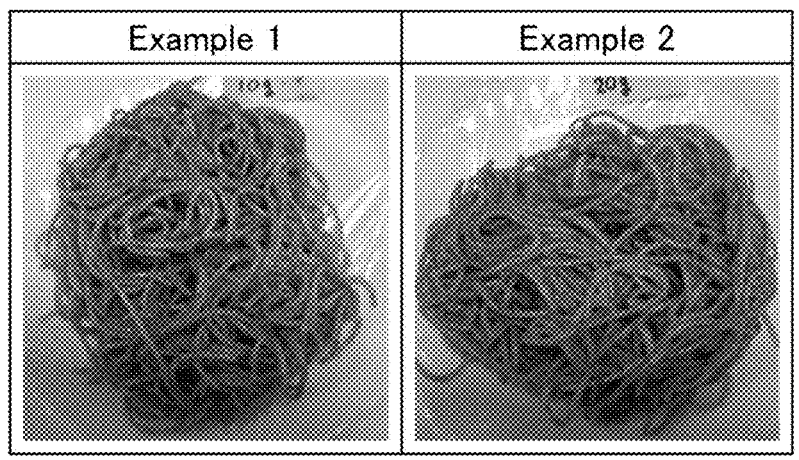
FIG. 2 represents photographs of basil spaghetti cooked using the emulsified basil pastes or the like produced as examples of the method for preventing oil separation in a processed food in accordance with the present invention.
Figure 2:
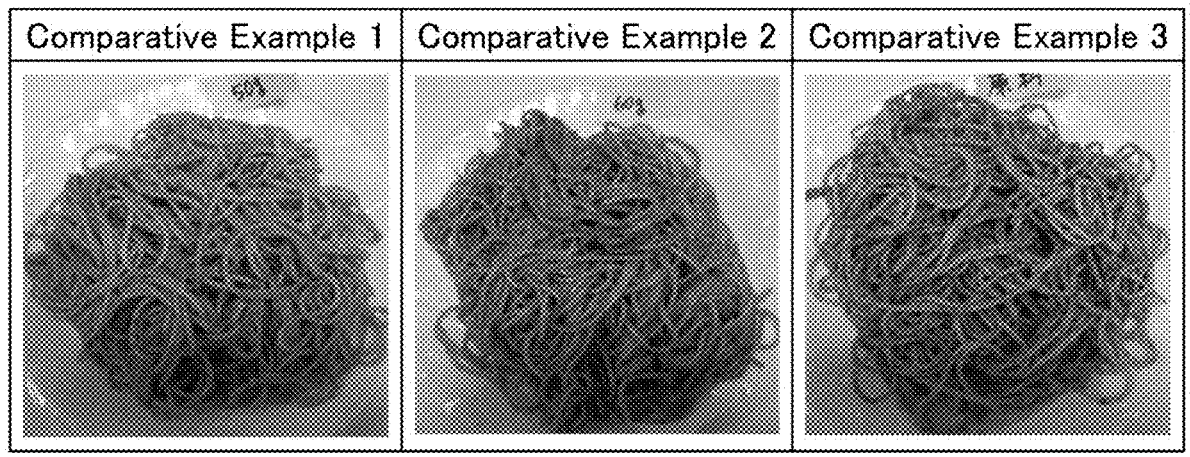
Figure 3:
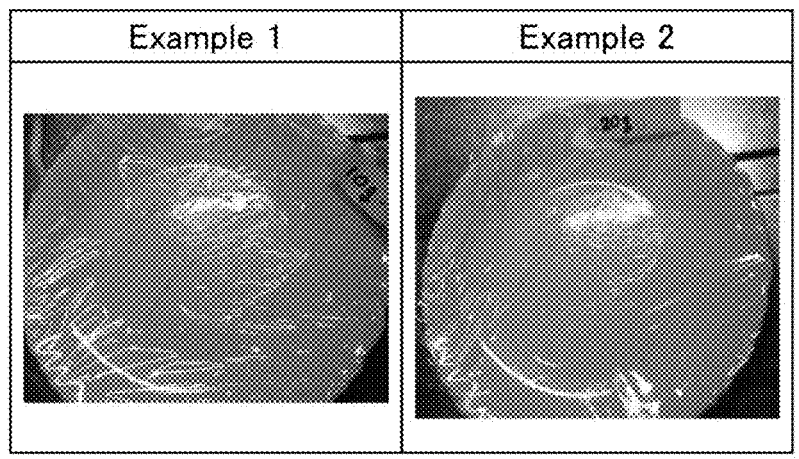
FIG. 3 represents photographs of the surface of each dish with the basil spaghetti put thereon, the basil spaghetti having been cooked using the emulsified basil pastes or the like produced as an example of the method for preventing oil separation in a processed food in accordance with the present invention.
Figure 3:
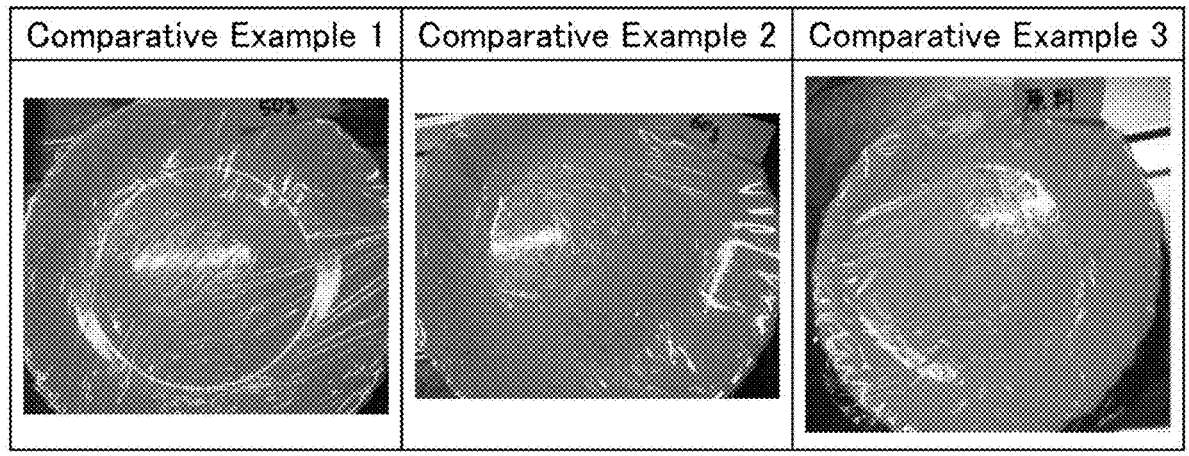

Next, the emulsified basil pastes of Examples 1 to 3, the emulsified basil pastes of Comparative Examples 1, 2, and the basil paste of Comparative Example 3 (30 g per each) were added to spaghetti (200 g) boiled for a prescribed time, and were well mixed, thereby cooking basil spaghetti. FIG. 2 represents photographs of each basil spaghetti cooked using the emulsified basil pastes of Examples 1, 2, and Comparative Examples 1, 2, and the basil paste of Comparative Example 3. FIG. 3 represents photographs of the surface of each dish with the basil spaghetti put thereon.

The basil spaghetti using the basil paste of Comparative Example 3 had the flavor of basil, but felt oily in aftertaste. Further, the surface of the dish used was checked. As a result, a large amount of the oil was deposited and left thereon. Each basil spaghetti using the emulsified basil pastes of Comparative Examples 1, 2 slightly had the flavor of basil and a salty taste. Further, on the surface of the dish used, a large amount of the oil deposited and left was not observed, and the stains due to the oil were scarcely observed.

In contrast, the basil spaghetti using each emulsified basil paste of Examples 1 to 3 had less sticky feeling due to the oil. The noodles were less likely to stick to each other, and tended to be disentangled, resulting in a very easy-to-eat state. Further, the basil spaghetti well gave off the flavor of basil, and was also colored in vivid green. Further, on the surface of the dish used, the oil deposited and left in a large amount was not observed, and the stain due to the oil was scarcely observed.

The experiment has indicated that the proportion of the emulsified oil-water to be mixed into the basil paste, to the oil content (the edible oil (vegetable oil) mixed as the raw material for the basil paste) in the basil paste, is preferably in the range of 10 to 40 wt %.

In the Examples, the emulsified oil-water at a mixing ratio of the edible oil to electrolyzed alkaline ionized water of 10:90 by weight ratio (10 wt % edible oil and 90 wt % electrolyzed alkaline ionized water) was used. However, even in the cases where the weight ratio was slightly increased or decreased (e.g., the case where the weight ratio was set at 9:91 (9 wt % edible oil and 91 wt % electrolyzed alkaline ionized water), and the case where the weight ratio was set at 11:89 (11 wt % edible oil and 89 wt % electrolyzed alkaline ionized water), the same effects as those confirmed in the Examples can be expected.

Further, in the Examples, as the target processed food to which the method for preventing oil separation in a processed food in accordance with the present invention is applied, a basil paste was used. The method in accordance with the present invention can be widely applied to other processed foods, for example, processed foods produced by mixing an edible oil with a food raw material containing water such as ramen soup, cold soup, onion oil, garlic oil, salad sauce, and dressing. Also in this case, the same effects as those confirmed in the Examples can be expected.

The invention claimed is:

1. A method comprising:
   stirring together:
   (i) a basil paste that comprises basil and an amount of edible oil, and
   (ii) an amount of an emulsified oil-water mixture that consists of an electrolyzed alkaline ionized water and edible oil, a ratio of the edible oil to the electrolyzed alkaline ionized water in the emulsified oil-water mixture being in a range of from 9:91 to 11:89 by weight,
   wherein the amount of the emulsified oil-water mixture that is stirred together the basil paste is in a range of from 10 to 40 wt % relative to the amount of the edible oil in the basil paste.

2. The method according to claim 1, wherein the electrolyzed alkaline ionized water in the emulsified oil-water mixture has a pH of at least 12.

3. The method according to claim 1, wherein the amount of the emulsified oil-water mixture that is stirred together the basil paste is in a range of from 23 to 40 wt % relative to the amount of the edible oil in the basil paste.

4. A method comprising:
   preparing a basil paste comprising basil and an amount of edible oil; and
   stirring together:
   (i) the basil paste, and
   (ii) an amount of an emulsified oil-water mixture that consists of an electrolyzed alkaline ionized water and edible oil, a ratio of the edible oil to the electrolyzed alkaline ionized water in the emulsified oil-water mixture being in a range of from 9:91 to 11:89 by weight,
   wherein the amount of the emulsified oil-water mixture that is stirred together the basil paste is in a range of from 10 to 40 wt % relative to the amount of the edible oil in the basil paste.

5. The method according to claim 4, wherein the electrolyzed alkaline ionized water in the emulsified oil-water mixture has a pH of at least 12.

6. The method according to claim 4, wherein the amount of the emulsified oil-water mixture that is stirred together the basil paste is in a range of from 23 to 40 wt % relative to the amount of the edible oil in the basil paste.

7. A method comprising:
   preparing a basil paste comprising basil and an amount of edible oil;
   preparing an emulsified oil-water mixture that consists of an electrolyzed alkaline ionized water and edible oil, a ratio of the edible oil to the electrolyzed alkaline ionized water in the emulsified oil-water mixture being in a range of from 9:91 to 11:89 by weight; and
   stirring together:
   (i) the basil paste, and
   (ii) an amount of the emulsified oil-water mixture,
   wherein the amount of the emulsified oil-water mixture that is stirred together the basil paste is in a range of from 10 to 40 wt % relative to the amount of the edible oil in the basil paste.

8. The method according to claim 7, wherein the electrolyzed alkaline ionized water in the emulsified oil-water mixture has a pH of at least 12.

9. The method according to claim 7, wherein the amount of the emulsified oil-water mixture that is stirred together the basil paste is in a range of from 23 to 40 wt % relative to the amount of the edible oil in the basil paste.

* * * * *